INFORMATION STORAGE SYSTEMS

Filed March 18, 1957 3 Sheets-Sheet 1

ARTHUR G. W. EDMUNDS *Inventor*

*By* Wenderoth, Lind & Ponack *Attorneys*

ARTHUR G. W. EDMUNDS Inventor

By
Wenderoth, Lind & Ponack Attorneys

INFORMATION STORAGE SYSTEMS

Filed March 18, 1957 3 Sheets-Sheet 3

ARTHUR G. W. EDMUNDS Inventor

By
Wenderoth, Lind & Ponack Attorneys

United States Patent Office
3,016,524
Patented Jan. 9, 1962

3,016,524
INFORMATION STORAGE SYSTEMS
Arthur Garnet Wolseley Edmunds, 69 Warwick Ave., Edgware, England
Filed Mar. 18, 1957, Ser. No. 646,779
Claims priority, application Great Britain Mar. 20, 1956
2 Claims. (Cl. 340—174.1)

This invention relates to information storage systems and particularly to systems of the kind in which information can be stored permanently in the sense that it can be retained in the store as long as is desired although in some circumstances it can be erased when no longer required and replaced by new information.

In systems of this kind it is necessary not only to provide means for recording information in the store but also means for reproducing or reading the stored information. The recording or writing operation must be capable of being accurately and reliably performed so that the required information is stored without spurious signals which might render the information when reproduced unintelligible. While the reproducing or reading operation must likewise be capable of being accurately and reliably performed, not only so that the required information can be obtained from the store with a low noise level, but also so that a rapid access may be had to the desired information. A further problem is to store the maximum information in the minimum volume and preferably without involving the use of relatively moving parts.

It is accordingly a principal object of the present invention to provide an improved method of recording, storing, and reproducing information which has the abovementioned characteristics.

A further object of the invention is to provide an improved method of recording, storing and reproducing information in which use is made of a storage member having magneto- or electro-strictive properties.

It is a further object of the invention to provide an improved method of recording, storing and reproducing information in which the information is stored in the form of localised changes in the magnetic or electric condition of a magneto- or electro-strictive body and in which the information is reproduced by changing the intensity of a magnetic or electric field in the body, thus producing mechanical waves in the body representative of the information stored.

A still further object of the invention is a method of recording information which consists in producing localised variations in the induced or remanent magnetism in a body of magneto-strictive material.

Other objects and advantages of the improved information recording and reproducing system of this invention will become apparent during the course of the following description with reference to the accompanying drawing, in which.

Figure 1:
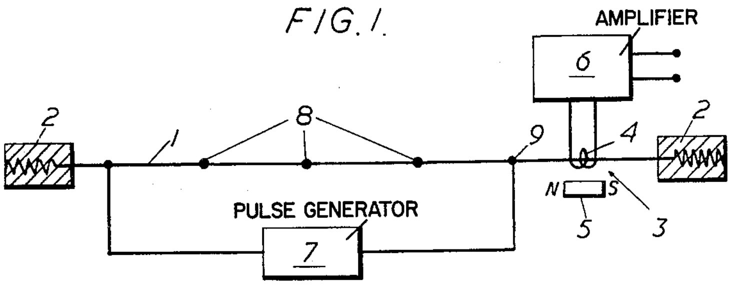
FIGURES 1 and 2 show diagrammatically two alternative forms of the system.

Referring now to FIGURE 1, there is shown diagrammatically an arrangement in which the body on which information is to be stored is constituted by a wire 1 of magneto-strictive material which extends between suitable terminations 2 arranged in known manner to prevent reflection of mechanical waves at the ends of the wire. At one end of the wire is arranged an electro-mechanical transducer 3 for producing electric signals corresponding to mechanical waves in the wire and which in the form shown comprises a coil of wire 4 surrounding the wire 1 and a permanent magnet 5 for supplying a local biasing field. The coil 4 is connected with a suitable amplifier 6. Other forms of transducer such for example as a piezoelectric crystal may be used if desired. An electric pulse generator 7 is connected electrically with the other end of the wire 1 and with a point 9 on its length adjacent the coil 4.

With such an arrangement, if the wire 1 is formed, in some suitable way, at points on its length with localised discontinuities indicated diagrammatically at 8 in its magnetic state and an electric pulse is transmitted from the generator 7 through the wire thereby to produce a momentary change in the magnetic field in and around the wire, it will be found that mechanical waves are set up in the wire at each discontinuity and can be detected by the transducer 3. Owing to the finite time of propagation of mechanical waves in the wire, such waves will be detected following the change in field after a time interval which is proportional to the distance of a local discontinuity from the transducer. Accordingly, if a plurality of such discontinuities are distributed along the length of the wire, a series of such mechanical waves will be generated and will be received at the detecting means at time intervals corresponding to the relative distances of the several discontinuities from the detecting means.

The arrangement may thus be used as a store for information since such information may be applied to the body according to the spatial arrangement of a series of local discontinuities in its magnetic condition and the information so stored may be read as a series of mechanical waves or, by means of an electro-mechanical transducer, as a series of electric signals.

The access time of the improved storage system is very short and the stored information is substantially permanent although in some forms of the system it may be erased when not required.

The arrangement of FIGURE 1 illustrates an important feature of the invention which enables the operation of the transducer for mechanical waves to be unaffected by the electric pulses from the generator. This is achieved by making the electrical connections of the pulse generator in such a way as to include the major portion of the wire 1 but not that portion on which the coil 4 of the transducer is arranged. As shown in FIGURE 1, therefore, the generator 7 is connected with the left-hand end of the wire and with a point 9 on its length so that the pulses travel along the wire between these points but not on that part of the wire to the right of the point 9 on which the coil 4 is arranged. It will be understood that the connection at the point 9 is effected in such manner as not to produce a discontinuity which will materially affect the passage of the mechanical waves to the transducer.

It will also be appreciated that in the operation of the system the pulse generator 7 may be arranged to produce single pulses when it is desired to read the information stored in the wire. Alternatively, this generator is arranged to produce a series of short electric pulses which are spaced in time by intervals which are somewhat greater than the time taken for a mechanical wave to propagate through the length of the wire.

It has been found that the discontinuities in the body need not necessarily be applied magnetically since if the body is stressed locally either by heating or mechanically as by bending, by forming notches in it, or otherwise, mechanical waves will also be formed in the wire as the field is changed.

It will be appreciated that the body need not necessarily be formed as a wire and could alternatively consist, for example, of a rod or tube. Moreover, the application of the reading field may be made in other ways, for example the electric pulse could be passed through a conductor which is arranged alongside the body, or in the case where the body is tubular, through a conductor which is arranged within the body. Alternatively the pulse could be passed through a uniformly wound coil arranged over the length of the body.

It will also be appreciated that in the case where the discontinuities are formed by changes in the remanent or induced magnetism of the body, the magnitude of the reading pulse should preferably be such that it will not be sufficient to produce permanent changes in the magnetisation of the body, otherwise the discontinuities may be materially modified or even erased.

On the other hand, in circumstances where it is desired to achieve a large signal/noise ratio for the electric signals generated by the transducer, the magnitude of the reading pulse may be made large enough to cause partial or total erasure of the stored information, and the electric signals may be applied immediately to re-write the information back into the body, the arrangement operating after the manner of the known circulating store.

Figure 2:
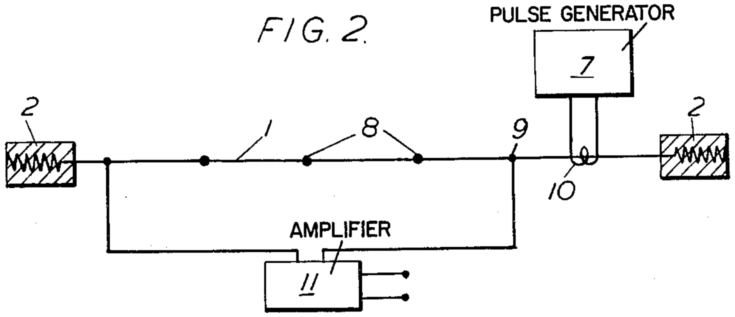

FIGURE 2 shows a possible alternative to the system of FIGURE 1. In this case a pulse generator 7 is coupled by a coil 10 to the magneto-strictive wire 1 so as to produce therein one or a series of mechanical waves, and an electric amplifier 11 is connected with the wire 1 in place of the pulse generator 7 of FIGURE 1. In this arrangement it is found that an electric signal is produced in the wire when the mechanical wave impinges on each of the discontinuities 8 and the amplifier output will thus consist of a series of signals separated by time intervals corresponding to the positions of the discontinuities 8 on the wire 1.

The magnetic discontinuities in the body may be produced, for example, by altering the intensity and/or by reversing the direction of remanent magnetisation of the body at selected points. While the wire may be magnetised locally in any direction, for example transversely or longitudinally, an effective method is to magnetise the body in such a way as to produce a local magnetic field having closed lines of force and substantially no external poles, which, for a circular wire, may be described as a circular magnetisation in a plane which is substantially perpendicular to the axis of its length. This form of magnetisation may be effected, for example, by the passage of an electric current through a short length of the wire as by discharging a condenser therethrough. It will be appreciated that in order to obtain sharply defined mechanical waves it is desirable that the local discontinuities shall consist of abrupt changes of magnetisation over a relatively short length of the body.

Figure 3:
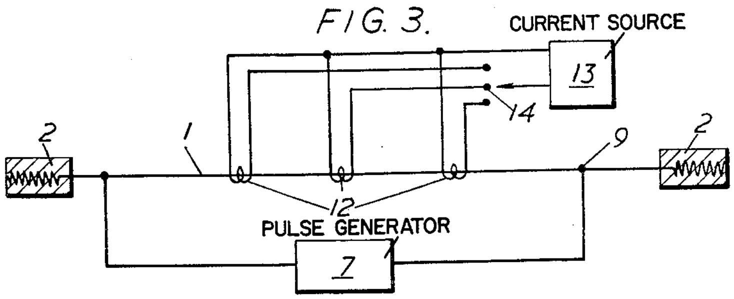
FIGURE 3 shows diagrammatically one method of recording information in the system of FIGURES 1 or 2, FIGURES 4, 5 and 6 show diagrammatically alternative methods of recording information.

FIGURE 3 illustrates one convenient method of recording or writing information onto the magneto-strictive body. As in the arrangement of FIGURE 1, the body in the form of a magneto-strictive wire 1 extends between terminations 2 and a pulse generator 7 is connected between one end of the wire and a point 9 intermediate its ends. Arranged along the length of the wire at points at which it may be desired to produce a local discontinuity in the remanent magnetism are a plurality of coils 12 which can be connected individually to a source of current 13 through a switch 14. The arrangement is such that neither the magnitude of the field associated with the pulse from the pulse generator 7 nor that of the field produced by a coil 12 when energised with current from the scource 13 is sufficient of itself to produce a permanent change in the remanent magnetism but if one of the coils 12 is connected with the source 13 and a pulse from the generator 7 is then passed through the wire, the combined effects of the two fields will be great enough to alter the remanent magnetism in the wire at the point at which the coil 12 is situated and the desired discontinuity in the remanent magnetism will thereby be produced.

Figure 4:
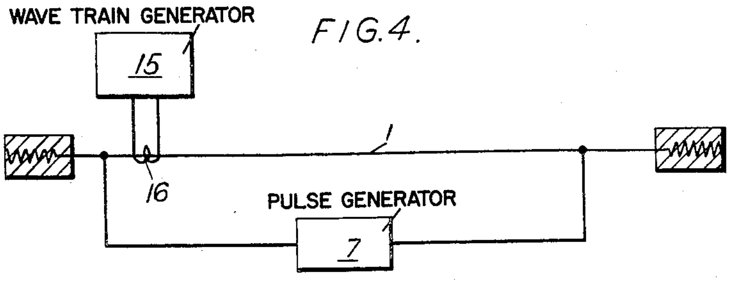

FIGURE 4 shows an alternative method of recording information on to the body which, as in the previously described arrangements, consists of a magneto-strictive wire 1. In this case a generator 15 arranged to produce a train of waves corresponding in number and spacing to the number and spacing of the desired discontinuities on the wire is arranged to introduce a corresuponding train of mechanical waves into the wire by means of the coil 16. As these waves travel along the wire a single electric pulse is produced by the generator 7 whereupon discontinuities in the remanent magnetism are produced in the wire in the positions occupied by the individual mechanical waves at the instant the pulse from the generator 7 is passed through the wire.

Figure 5:
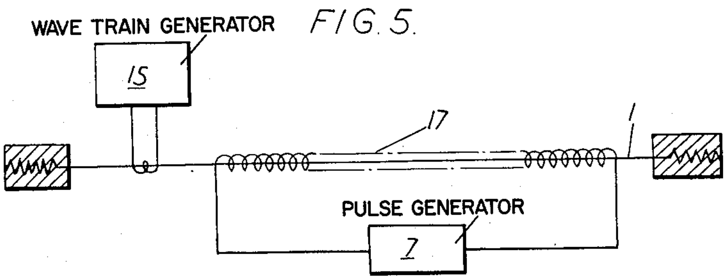

Instead of passing the electric pulse from the generator 7 directly through the wire 1 it may be passed through a separate conductor which is arranged parallel with and close to the wire 1. Alternatively, as shown in FIGURE 5, the pulse from the generator 7 may be passed through a long coil 17 which surrounds the wire 1.

Figure 6:
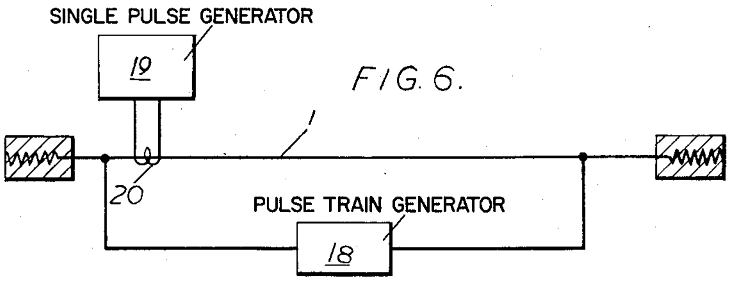

A further alternative arrangement is illustrated in FIGURE 6. In this case there is provided a pulse generator 18 which produces a train of electric pulses having the distribution it is desired to record on the wire 1. There is further provided a single pulse generator 19 which is coupled to the wire through a coil 20 and is effective to cause a single mechanical wave to travel along the wire. Corresponding to the operation of the arrangement of FIGURE 4, it is found that a discontinuity in the remanent magnetism of the wire is produced at each point along it where the single travelling mechanical wave is overtaken by an electric pulse from the generator 18.

As mentioned above, the discontinuities in the magneto-strictive body need not be formed by changes in remanent magnetism of the body but can be produced by induced magnetism. For example, if the body is arranged close to a magnetic member which is provided with discontinuities in its remanent magnetism, a corresponding pattern of magnetic discontinuities will be induced in the body. Such an arrangement has the advantage that it is more tolerant of overloads as regards the reading field, which if the information were stored as changes in remanent magnetism of the body, might tend to erase or partially erase such information.

The arrangement also offers the possible advantage that a change in the information stored could be effected by bringing another magnetic member having a different pattern of remanent magnetism adjacent the body, or equivalently the magnetic member could be in the form of a tape or wire having different patterns of remanent magnetism along its length and means could be provided for moving such member relative to the body as required.

In a further modification the body could be formed of two parts firmly secured together, one part being magneto-strictive and "soft" and the other part being non-magneto-strictive but highly retentive magnetically.

Such a bi-metal body could be used in certain of the arrangements described above, the retentive part acting to store information magnetically and to induce the pattern of stored information into the magneto-strictive part which effects the magneto-mechanical conversion. This arrangement enables materials having good magneto-strictive properties but poor magnetic properties to be used.

Figure 7:
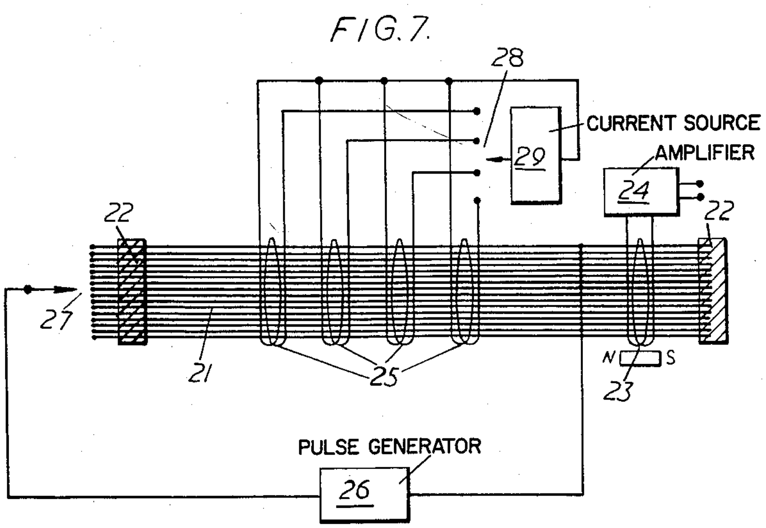
FIGURE 7 shows one form of a complete recording and reproducing system.

FIGURE 7 illustrates one form of a complete system for recording, storing and reading information. As shown, the system comprises a plurality of wires 21 which extend in a common plane between suitable anchorages and terminations 22, the wires being arranged parallel to one another and slightly spaced, for example by a distance of two diameters or so. At the right-hand end of the arrangement of wires there is a coil 23 surrounding all of them which is connected with an amplifier 24, while arranged along the length of the wires is a plurality of narrow coils 25 each of which surrounds all the wires. A pulse generator 26 is connected with a point on each of the wires adjacent the coil 23 and through a switch 27 which in practice will probably be some form of high speed electronic switch with the left-hand end of individual wires 21. The coils 25 are also connected by means of a switch 28 so that they can be connected individually with a source of current 29.

In the system described information may be recorded on any one of the wires by energising one or more of the coils 25 from the source 29 and simultaneously passing a pulse, preferably of square waveform, from the generator 26 through the particular wire 21. As described previously, the combined effect of the field due to the pulse and due to the coil 25 will change the remanent magnetism in that wire through which the pulse passes but none of the other wires encircled by the energised coil 25 will be materially affected. For reading information so stored in the wires pulses from the generator 26 will be supplied through the switch 27 to a selected one of the wires 21 and the mechanical wave trains produced in this wire by the passage of each pulse through the discontinuities in the wire will be detected by the coil 23 and the amplifier 24 will produce an output consisting of a train of electric signals corresponding to the pattern of the discontinuities in the particular wire.

Figure 8:
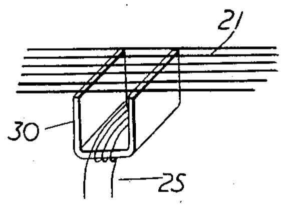
FIGURES 8 and 9 show modifications of the system of FIGURE 7.

In this arrangement it may be found difficult to thread a number of the wires 21 through the coils 25, more especially since these wires are rather easily damaged, a bend or kink producing a discontinuity which it is difficult to erase. To avoid this difficulty each coil 25 may be arranged as shown in FIGURE 8 on a U shaped core 30 conveniently of mu-metal which is positioned as shown with its poles adjacent the wires 21.

In the arrangement of FIGURE 7 it is not necessary that the wires 21 are arranged in a common plane; they could, for example, be arranged on the surface of a cylinder or if desired as a cable since, provided there is a certain minimum spacing between them and the level of the recording and reading fields is controlled, there will be negligible interference between the several wires either when reading or when recording information thereon.

The recording of information may also be effected in other ways. For example the method described with reference to FIGURE 4 may be used if the coil 16 in this figure is arranged to surround all the wires 21 so that the desired train of mechanical waves is propagated through all the wires. If now an electric pulse from the generator 26 is applied to one of the wires only, the desired information may be recorded on this wire without affecting the other wires or modifying the information already stored on them.

The methods of FIGURES 5 and 6 may also be used for recording in the arrangement of FIGURE 7. In a further alternative method of recording, the arrangement of FIGURE 7 may be modified so that a pulse, preferably of square waveform, is applied to one or more of the coils 25 while a direct current pulse is passed through that wire 21 on which it is required to record information.

It is also possible to use the method described above in which a condenser is discharged through a short length of the wire. In this case a pair of light contacts are appropriately positioned on the wire and are connected with a charged condenser through a switch and preferably a resistance. In the event that it is found that the record has been made in the wrong position, it can be erased readily by applying a second and reversed discharge.

Figure 9:
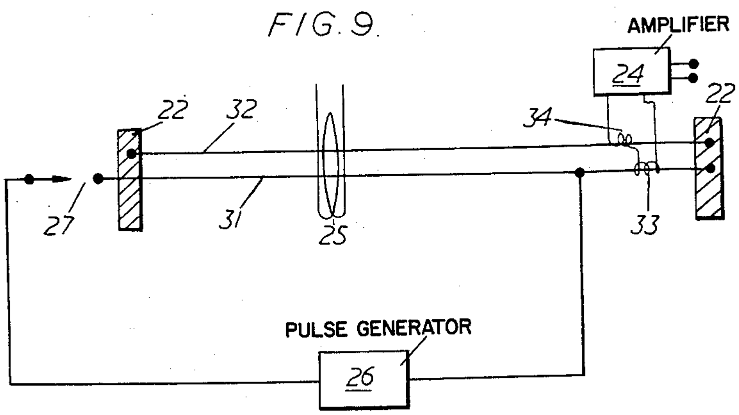

In the above description of the system shown in FIGURE 7 it is stated that information can be recorded on any one of the wires 21 without affecting materially any other of the wires. While this statement is true if material of suitable quality is used for the wires, where a less suitable material is used it may be found that the field provided by a coil 25 may be sufficient to produce an unwanted change in remanent magnetism on wires other than that through which the electric recording pulse is passed and that such unwanted changes in the remanent magnetism can produce spurious signals when a reading pulse is applied. It has been found that the discrimination between the wanted and unwanted changes in remanent magnetism may be increased if all the wires are conditioned magnetically before the system is put into operation. This may be done, for example, by passing through the wires an electric pulse which has an amplitude greater than and of reversed polarity to that normally used for reading or recording and which is followed by a smaller pulse of normal polarity. Alternatively, the effect of undesired changes in remanent magnetism may be more or less completely eliminated if each wire of the system shown in FIGURE 7 is replaced as shown in FIGURE 9 by a pair of wires 31 and 32 to only one of which, 31, the reading or recording pulse is applied. The reading coil 23 of FIGURE 7 in this arrangement would be formed in two oppositely wound halves 33 and 34 connected in series, the wire 31 of the pair being passed through one half coil 33 and the other wire 32 being passed through the other half coil 34. In such an arrangement any undesired change in remanent magnetism which happens to be formed on the two wires of a pair will tend to produce in the two halves of the reading coil equal and opposite signals which therefore cancel out, while information recorded on the wire 31 in the manner described above will still produce the desired output from the reading coil.

In carrying the invention into effect it may be found that difficulties are encountered owing to the unsuitability of the magneto-strictive material used. In particular, it may be found that when reading spurious signals are produced which make it difficult to recognize the required signals. Such effects are believed to be due to variations in magnetic properties along the wire. It has been found that if the wire is first stretched beyond its elastic limit to give a permanent extension of about 0.5% of its initial length and the wire is then annealed (but not enough to cause too large a crystal growth since large crystals themselves produce spurious signals) and this stretching-annealing cycle is repeated, say, ten times, a great improvement in the uniformity of the wire as regards its magnetic properties is obtained.

A further difficulty may arise owing to the fact that a particular specimen of magneto-strictive material may have an appreciable temperature coefficient of velocity of propagation of mechanical waves. This co-efficient may be reduced towards zero in selected material by applying the treatment described in my co-pending application Serial No. 617,238 now abandoned. Such treatment consists in annealing a specimen of nickel-iron alloy containing about 45% nickel, stretching it beyond its elastic limit by a predetermined amount, and then applying heat treatment at a low temperature of around 100° C.

If both the above treatments are to be applied the technique is to apply, say, ten cycles of the treatment to remove non-uniformity of magnetic remanence finishing off with a final stretch and heat treatment designed to adjust the temperature coefficient. It is found that an unsuitable degree of final stretch is required to achieve the required result, then the selection of an alloy having a different percentage of nickel is indicated.

Although in the above examples energy transformation between electric pulses and mechanical waves is by virtue of magneto-strictive effects, it is contemplated that this may alternatively be effected by the use of magnetic attraction and/or repulsion and Faraday induced E.M.F. Thus, for example, if an arrangement is used in which the wire is made of magnetic material with discontinuities formed as local magnetised areas, a sudden change in the field surrounding the wire will, by virtue of relatively intense localised attraction or repulsion, cause mechanical waves to be set up in the wire at each such discontinuity and these waves may be detected by a suitably arranged transducer. Moreover, if a suitable electro-mechanical transducer is arranged to produce mechanical waves in the said wire which is also disposed in a magnetic field, the resulting movement of the discontinuities consisting of locally magnetised areas will produce an electric current in the wire.

Although in the above examples of the system of this invention the body has been described as being constituted of magneto-strictive or magnetic material and the discontinuities therein as consisting of changes in remanent magnetism, corresponding arrangements are possible in which the body is of electro-strictive material and the discontinuities are produced electrostatically.

Figure 10:
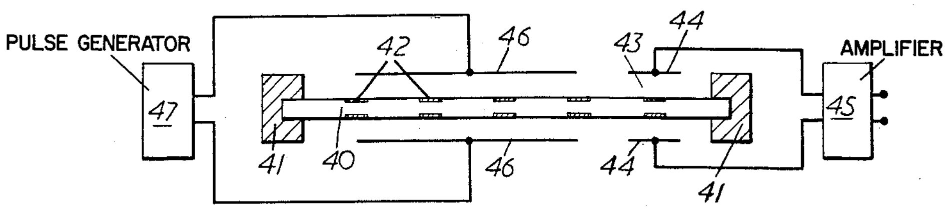
FIGURE 10 shows a modification of the system of FIGURE 1.

It is now well known that a body of material such as barium titanate or lead titanate has electro-strictive properties and that particularly if its temperature is changed while a polarising potential is applied between opposed electrodes arranged on the surface of the body, the polarisation will remain after the polarising potential is removed. Accordingly, such polarised areas may be used as the desired discontinuities in the system of this invention. One arrangement of this kind is illustrated in FIGURE 10. A bar 40 of appropriate electro-strictive material is mounted in suitable terminations 41 and is formed along its length with one or more polarised areas 42 and at the right-hand end with a further polarised area 43. This latter portion of the bar extends between two electrodes 44 which are connected with an amplifier 45 and constitute an electro-mechanical transducer for producing electric signals corresponding to mechanical waves. That portion of the bar on which the polarised areas 42 are provided is arranged between electrodes 46 which are connected with a pulse generator 47.

In operation, when the field in the bar is changed by the application of a pulse to the electrodes 46, mechanical waves will be set up in the bar at each of the discontinuities formed by the polarised areas 42 and the amplifier output will consist of a series of electric signals corresponding to the number and spacing of the discontinuities.

What I claim is:

1. Apparatus for recording, storing and reproducing information comprising an elongated member of magneto-strictive material supported at non-reflecting terminations, recording means including means for producing localised variations in the magnetic field in said member at spatially arranged points on a part of said member, reproducing means including means for passing an electric pulse through said part of said member, and an electromechanical transducer coupled with another part of said member.

2. Apparatus for storing and reproducing information comprising an elongated member of magneto-strictive material having information stored therein as a spatially arranged series of variations in the magnetic condition of said member, said series of variations extending over a part of said member, a pulse generator connected with the ends of the said part of said member for passing an electric pulse therethrough, and an electromechanical transducer coupled to said member at a point on another part thereof.

References Cited in the file of this patent

UNITED STATES PATENTS

| | | |
|---|---|---|
| 2,736,824 | Roberts | Feb. 28, 1956 |
| 2,736,881 | Booth | Feb. 28, 1956 |
| 2,790,160 | Millership | Apr. 23, 1957 |
| 2,846,654 | Epstein et al. | Aug. 5, 1958 |
| 2,854,593 | Hobrough | Sept. 30, 1958 |